United States Patent
Thornberry et al.

(10) Patent No.: US 8,750,673 B2
(45) Date of Patent: Jun. 10, 2014

(54) SYSTEMS AND METHODS FOR REDUCING A USER'S ABILITY TO PERCEIVE HARD DRIVE NOISE

(75) Inventors: Kevin Thornberry, Leeds (GB); Andy Thurling, Keighley (GB)

(73) Assignee: Eldon Technology Limited, Steeton (GB)

( * ) Notice: Subject to any disclaimer, the term of this patent is extended or adjusted under 35 U.S.C. 154(b) by 27 days.

(21) Appl. No.: 13/474,496

(22) Filed: May 17, 2012

(65) Prior Publication Data

US 2012/0293888 A1 Nov. 22, 2012

(30) Foreign Application Priority Data

May 20, 2011 (EP) .................................... 11166994

(51) Int. Cl.
*H04N 5/765* (2006.01)
(52) U.S. Cl.
USPC ........................................................ 386/200
(58) Field of Classification Search
USPC ..................... 360/75; G9B/21.003
See application file for complete search history.

(56) References Cited

U.S. PATENT DOCUMENTS

| | | | |
|---|---|---|---|
| 6,757,481 B1 * | 6/2004 | Nazarian et al. ............... | 386/350 |
| 7,271,976 B2 * | 9/2007 | Ishii et al. ....................... | 360/75 |
| 8,265,300 B2 * | 9/2012 | Reid et al. ...................... | 381/104 |
| 2005/0187880 A1 * | 8/2005 | Ezaki ............................... | 705/59 |
| 2007/0153713 A1 * | 7/2007 | Anttila ........................... | 370/270 |
| 2008/0086585 A1 * | 4/2008 | Fukuda et al. ................. | 711/100 |
| 2008/0177536 A1 * | 7/2008 | Sherwani et al. .............. | 704/235 |
| 2009/0281642 A1 * | 11/2009 | Ady et al. ....................... | 700/94 |

FOREIGN PATENT DOCUMENTS

| | | | |
|---|---|---|---|
| JP | 2008-123615 A | | 5/2008 |
| JP | 2008123615 A | * | 5/2008 |
| WO | 2006/046179 A2 | | 5/2006 |
| WO | 2009/137232 A2 | | 11/2009 |

OTHER PUBLICATIONS

Extended European Search Report for EP 11 16 6994, mailed Oct. 4, 2011, 7 pgs.
Examination Report for corresponding European Patent Application No. 11166994.1, mailed Jun. 14, 2013, 3 pages.

* cited by examiner

*Primary Examiner* — Thai Tran
*Assistant Examiner* — Nien-Ru Yang
(74) *Attorney, Agent, or Firm* — Seed IP Law Group PLLC

(57) ABSTRACT

A system for reducing a user's ability to perceive noise generated by a storage device. The system includes a processing unit and a storage device communicably coupled to the processing unit. The storage device may be, for example, a hard disk drive. The processing unit is provided with computer implemented instructions to: (i) receive a content stream comprising an audio component and a video component, wherein the content stream further comprises volume data and timing data relating to the audio component; and (ii) instruct the storage device to carry out read/write operations of the hard disk drive based, at least in part, on the volume data and the timing data.

16 Claims, 2 Drawing Sheets

SYSTEMS AND METHODS FOR REDUCING A USER'S ABILITY TO PERCEIVE HARD DRIVE NOISE

BACKGROUND

Technical Field

The present disclosure relates to systems and methods for operating a storage device, and more particularly to systems and method for reducing a user's ability to perceive noise generated by a storage device.

BRIEF SUMMARY

In one embodiment, the present disclosure relates to a method for reducing a user's ability to perceive noise generated by a storage device, such as a hard disk drive.

The method includes providing a processing unit and a storage device communicably coupled to the processing unit. The storage device may be, for example, a hard disk drive or may include a hard disk drive. The method further includes receiving, utilizing the processing unit, a content stream comprising an audio component and a video component. The content stream further comprises volume data and timing data relating to the audio component. The method further includes communicating instructions to the storage device for carrying out read/write operations of the hard disk drive, wherein the instructions are based, at least in part, on the volume data and the timing data.

In one embodiment, the present disclosure relates to a system for reducing a user's ability to perceive noise generated by a storage device. The system includes a processing unit and a storage device communicably coupled to the processing unit. The processing unit is provided with computer implemented instructions to: (i) receive a content stream comprising an audio component and a video component, wherein the content stream further comprises volume data and timing data relating to the audio component; and (ii) instruct the storage device to carry out read/write operations of the storage device based, at least in part, on the volume data and the timing data.

Embodiments of the disclosure provide a system comprising a processing unit and a storage device communicably coupled to the processing unit, the storage device comprising a hard disk drive. The processing unit is provided with computer implemented instructions to: receive a content stream comprising an audio component and a video component, wherein the content stream further comprises volume data and timing data relating to the audio component; and to instruct the storage device to carry out read/write operations of the hard disk drive based, at least in part, on the volume data and the timing data.

In some embodiments, the processing unit is provided with further computer implemented instructions to determine, based at least in part on the volume data and the timing data, volume as a function of time for the audio component.

In some embodiments, the processing unit may be provided with further computer implemented instructions to identify a plurality of audio segments of the audio component, wherein a plurality of the identified segments correspond to at least one of periods of silence, periods of relatively high volume, periods of relatively low volume, periods of maximum volume, and periods of minimum volume.

In some embodiments, the hard disk drive comprises a head and a disk, and the processing unit is provided with further computer implemented instructions to establish acceleration/deceleration rates of the head for carrying out read/write operations on the disk, wherein the acceleration/deceleration rates are established by the processing unit based on the determined volume as a function of time. The processing unit may be further provided with further computer implemented instructions to instruct the head to move at relatively high and/or maximum acceleration/deceleration rates concomitantly with respect to either or both of periods of relatively high volume and periods of maximum volume. The processing unit may additionally, or alternatively, be provided with further computer implemented instructions to instruct the head to cease movement, move at relatively low acceleration/deceleration rates, and/or move at minimum acceleration/deceleration rates concomitantly with respect to either or both of periods of relatively low volume and periods of silence.

The system in some embodiments further comprises a display device, wherein the processing unit is provided with further computer implemented instructions to transmit the audio and video components to a display device.

In some embodiments, the processing unit and storage device are components of a content receiver.

In some embodiments, the content stream comprises television programming.

Embodiments of the disclosure may provide a method for reducing a user's ability to perceive noise generated by a hard disk drive, the method comprising: receiving a content stream comprising an audio component, a video component, volume data relating to the audio component, and timing data relating to the audio component; analyzing, by a computing device, the volume data and timing data to determine a portion of the audio component having a volume exceeding a threshold; and transmitting instructions to the hard disk drive for carrying out read/write operations, wherein the instructions are based, at least in part, on the volume data and the timing data.

The method may in some embodiments further comprise determining, based at least in part on the volume data and the timing data, volume as a function of time for the audio component.

The method may in some embodiments further comprise identifying a plurality of audio segments of the audio component, wherein a plurality of the identified segments correspond to any or all of periods of silence, periods of relatively high volume, periods of relatively low volume, periods of maximum volume, and periods of minimum volume.

The hard disk drive may comprise a head and a disk, and the method may further comprise establishing acceleration/deceleration rates of the head for carrying out read/write operations on the disk, wherein the acceleration/deceleration rates are established by the processing unit based on the determined volume as a function of time. The method may in some embodiments further comprise instructing the head to move at relatively high and/or maximum acceleration/deceleration rates concomitantly with respect to either or both of periods of relatively high volume and periods of maximum volume.

The method may further comprise providing a display device, and transmitting the audio and video components to the display device.

The method may further comprise instructing the head to cease movement, move at relatively low acceleration/deceleration rates, and/or move at minimum acceleration/deceleration rates concomitantly with respect to either or both of periods of relatively low volume and periods of silence. Such a method may further comprise providing a display device, and transmitting the audio and video components to the display device.

The content stream may in some embodiments comprise television programming.

Embodiments of the disclosure may further provide a method of storing content on a storage medium, the method comprising: receiving a content stream comprising an audio component and a video component; analyzing the content stream, utilizing the processing unit, to identify a portion of the audio component having a volume exceeding a threshold; and communicating instructions to hard disk drive for carrying out read/write operations concurrently with output of the identified portion of the audio component.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes sample systems, methods, and computer program products that embody various elements of the present disclosure. However, it should be understood that the described disclosure may be practiced in a variety of forms in addition to those described herein.

Current multimedia recording devices, such as digital video recorders (DVRs), employ hard disk drives to store and retrieve multimedia content. During the storage and retrieval operations, the hard disk drive generates noise. Typically, this noise is attributable to movement of an electromagnetic head, particularly rapid acceleration and/or deceleration of the head as it moves across the hard disk's surface. Since DVRs are often located in close proximity to a display device on which audio and video content is outputted to a user, such as a television, the noise can frustrate a user's ability to enjoy the content. Therefore, mitigation of hard disk noise and/or mitigation of a user's ability to detect hard disk noise may be desirable. This may also be true with respect to other storage devices, such as optical storage and the like.

Known techniques for mitigating the effect of noise generated by hard disks include implementation of a "quiet mode" in which the drive head is moved at a rate sufficient to perform read/write operations at a predetermined period prior to a point that the operation is required, as opposed to moving at a maximum or high rate and carrying out the operation as soon as possible. In this manner, the rate of acceleration/deceleration required by the drive head and, thus, noise generated by the hard disk may be reduced. While this technique may be effective for reducing the amount of noise generated by a hard drive, it may also negatively affect performance (e.g., reduce maximum rate of data throughput of the hard disk). Accordingly, systems and methods for reducing the effect of noise generated by hard disks, while maintaining hard disk performance, may be desirable.

Figure 1:
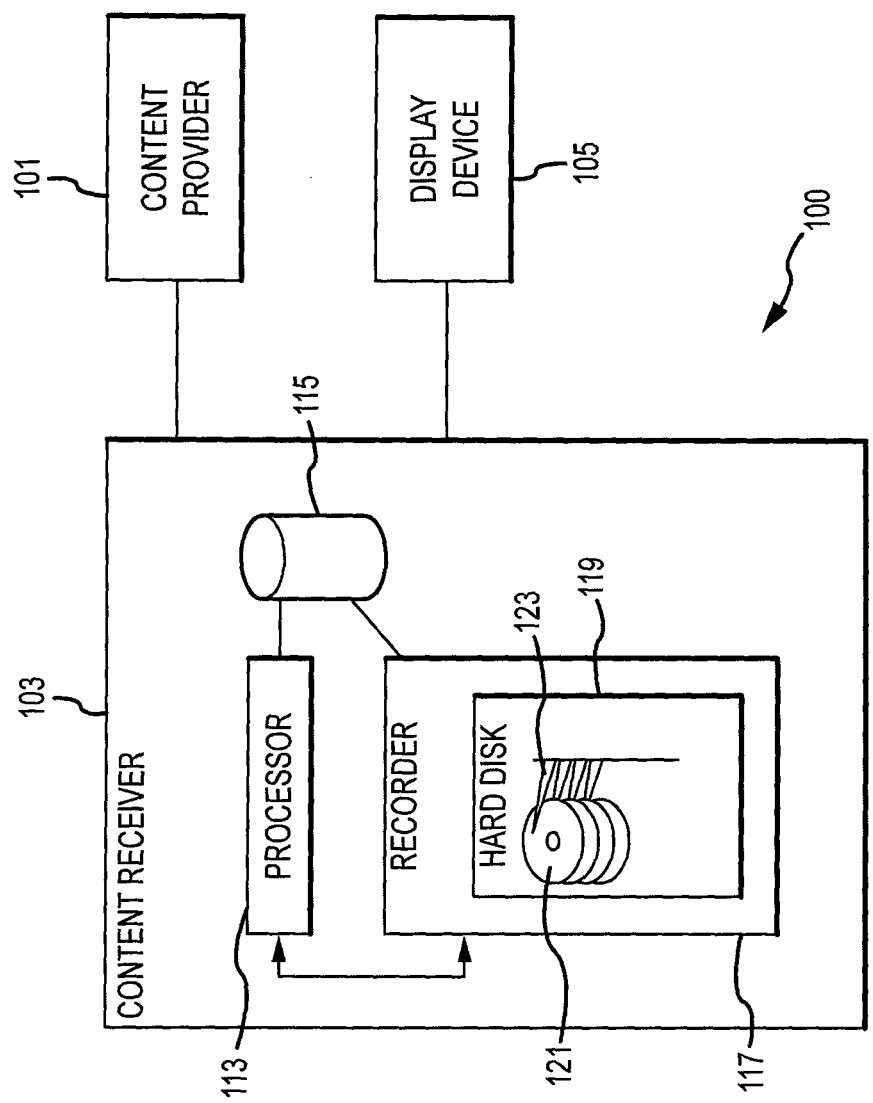
FIG. 1 is a block diagram illustrating a system for reducing a user's ability to perceive noise generated by a storage device in accordance with some embodiments of the present disclosure.

FIG. 1 is a schematic illustration of a general operating environment 100 showing components and features of embodiments discussed herein. Generally, embodiments discussed herein are directed to reducing a user's ability to perceive noise generated by a hard drive by controlling the timing of read/write operations carried out by the hard drive. In some embodiments, the operating environment 100 may include a content provider 101, a content receiver 103, and a display device 105.

In illustrative embodiments, the content provider 101 may be any content provider that provides a multimedia content transmission to the content receiver 103 such as, without limitation, a satellite television service, a direct television or cable television service, or a streaming video delivered across a network such as the Internet. The multimedia content transmission may include or relate to television programming, which may include both video and audio components.

In some embodiments, the multimedia content may include an audio component that is decoded or otherwise processed by the content receiver 103 to audibly present content to users. The audio component may include or be associated with timing data relating to the timing of the presentation of audio to users, such as presentation time stamp data (PTS). The PTS data may be employed by the content receiver 103 to achieve synchronization of the content stream's separate elements (e.g., video, audio, subtitles) when presented to the viewer. The audio component may, additionally or alternatively, include or be associated with information regarding the volume at which the segments of audio that comprise the audio component are to be presented to users (i.e., the relative loudness/quietness of the audio) (hereinafter, "volume data"). It is to be appreciated that the audio components of the present disclosure may be comprised of a plurality of sub-components, or segments, that are presented to users over a range of volumes. For purposes of the present disclosure, relatively high volume may refer to a certain sub-range within this overall volume range, such as that exceeding a threshold volume. Similarly, relatively low volume may refer to another certain sub-range within the overall volume range, such as that falling below a threshold volume. In addition or alternative to being transmitted along with the multimedia content, the timing data and the volume data may be transmitted to the content receiver 103 by the content provider and/or a third party provider in a separate transmission, such as a network transmission.

The content receiver 103 may be any device capable of receiving multimedia content included in a broadcast or other content service transmission from a content provider. For example, the content receiver 103 may be configured to communicate with or receive signals from the content provider 101, which may broadcast, transmit, or otherwise deliver multimedia content and/or content data to the content receiver 103. The content receiver 103 may be in the form of, for example, a set-top box, a digital video recorder, a cable receiver, a general purpose computing device, a mobile computer, a video game system, and/or any other electronic device capable of receiving content from the one or more content providers via one or more wired communication links, wireless communication links, and/or physical distribution systems. Accordingly, certain elements of the content receiver that may be physically present are omitted in FIG. 1 for simplicity's sake. As one example, a content receive in the form of a satellite set-top box may include a tuner, demodulator and the like.

In some embodiments, the content receiver 103 may be associated with an individual, business or other entity, user, or subscriber that receives a content service transmission from the service provider 101. Generally, the terms "user" and/or "subscriber" refer to individuals or companies that receive the content service transmission. This may include individuals or companies that have purchased a subscription to the content service transmission.

In illustrative embodiments, the content receiver 103 may include one or more processing units 113, one or more one or more non-transitory storage media 115, and a storage device 117 that includes or is a hard disk 119.

In some embodiments, the processing unit 113 of the content receiver 103 may be operable to execute instructions stored in the non-transitory storage medium 115 in connection with various functions associated with the receiver 103. For example, the processing unit 113 may be configured to present video and/or audio components of a content stream to users on a display device. Additionally, the processing unit 113 may be configured to communicate with the storage device 117 for controlling or otherwise directing read/write operations of the hard disk 119. Control of the hard disk 119 may be based, at least in part, on the volume data and the timing data associated with an audio component of a content stream. For example, the processing unit 113 may be configured to read and/or process the volume and timing data in advance of presentation of the audio to users such that the processing unit 113 may determine the volume of the audio that will be output to users as a function of time.

In instances in which the volume and timing data corresponds to content that has been previously recorded (e.g., through operation of the storage device 117), the processing unit 113 may determine the volume vs. time data with respect to the entire length of the content or one or more segments of the entire length of content. In instances in which the volume and timing data correspond to content that is being currently transmitted from the content provider (a "live" broadcast), it is to be appreciated that the processing unit 113 may receive the relevant data (e.g., audio component, video component, volume data, timing data) at some period prior to the audio and video being output to users (hereinafter, "buffer period"). In such instances, the processing unit 113 may determine the volume vs. time data with respect to the buffer period. In either instance, the processing unit 113 may be configured to then direct the timing of read/write operations of the hard disk 119 based on the volume of audio that will be output to users at a given time. For example, the processing unit 113 may be configured to direct the hard disk 119 to preferentially carry out read/write operations, or a selected segment of read/write operations (e.g., operations associated with heightened noise generation such as those involving rapid acceleration/deceleration) concomitantly with respect to periods of relatively high audio volume outputted to users.

Similarly, the processing unit 113 may be configured to direct the hard disk 119 to preferentially cease read/write operations, or carry out a selected segment of read/write operations (e.g., operations associated with low noise generation such as those involving low acceleration/deceleration) concomitantly with respect to periods of silence and/or periods of relatively low audio volume being output to users. Of course, in instances of extended periods of silence and/or relatively low volume, adherence to the foregoing preferential operating parameters may not allow for critical read/write operations to be carried out (e.g., low acceleration/deceleration rates of the head over a certain period would be insufficient for the hard disk to perform critical operations), in which case the processing unit 113 may direct the hard disk 119 to, for example, carry out any critical read/write operations irrespective of the preferences, or at the minimum acceleration/deceleration rates necessary to carry out critical read/write operations.

The receiver 103 may also include or be associated with a memory or other storage device 115, such as magnetic or optical storage. The storage device 115 may be volatile or non-volatile memory implemented using any suitable technique or technology such as random access memory (RAM), disk storage, flash memory, solid state and/or other suitable storage medium. The storage device 115 may be located within the receiver 103 or separately from the receiver 103.

In some embodiments, the content receiver 103 may include or be associated with a storage device 117, such as a digital video recorder. The storage device 117 may be operated by the processing unit 113 to record particular segments of multimedia content, such as television programs and/or portions of television programs. Additionally or alternatively, any segment of multimedia content may be recorded. When the particular segment occurs, the storage device 117 may record the segment, such that it is available for later viewing by a user. In addition to this functionality, the storage device 117 may buffer a certain amount of content during a live transmission. Buffering a live transmission allows a user to pause and/or rewind the content of the transmission and to then display the content in a non-live or delayed manner. While the present disclosure is described with respect to embodiments in which the storage device 117 is provided as a component of the content receiver 103, the storage device 117 may be provided as a stand alone device in communication with the content receiver 103, which has its own processing unit, memory, processing logic, etc.

In various embodiments, the storage device 117 may include a hard disk drive 119 configured to carry out the read/write operations necessary to perform the foregoing functions of the storage device 117. The hard disk drive 119 may include a magnetic disk 121 for storing data and a magnetic head 123 for writing and reading to and from the magnetic disk 121. It is to be appreciated that the magnetic head 123 is capable of acceleration/deceleration movement over a range of values to perform the read/write operations and that, generally, the rate of acceleration/deceleration affects the maximum rate of data throughput of the hard disk. As discussed above, noise generated by the storage device 117 may be attributable to the magnetic head 123 moving across the magnetic disk 121 to carry out read/write operations and, the magnitude of the noise may increase as the acceleration/deceleration rates are increased. For purposes of the present disclosure, relatively high acceleration/deceleration rates may refer to a certain sub-range within this overall range, such as that exceeding a threshold rate. Similarly, relatively low acceleration/deceleration rates may refer to another certain sub-range within the overall range, such as that falling below a threshold rate.

In some embodiments, the display device 105 may be any kind of display device such as a cathode ray tube display, a liquid crystal display, a television, a computer monitor, or other electronic display device.

Figure 2:
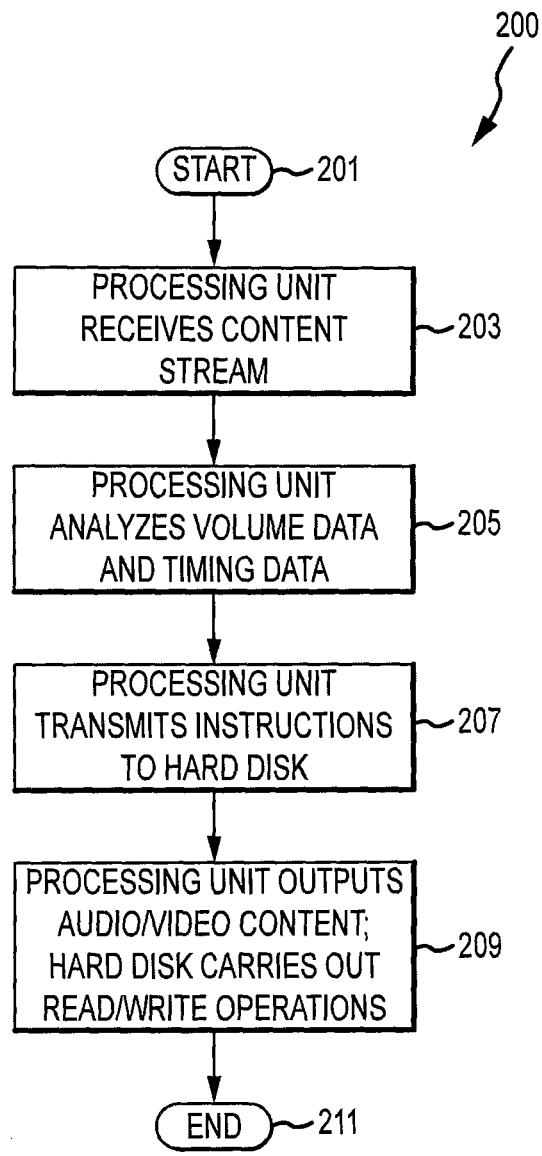
FIG. 2 is a flow chart illustrating a method for reducing a user's ability to perceive noise generated by a storage device in accordance with some embodiments of the present disclosure. This method may be performed by the system of FIG. 1.

FIG. 2 illustrates a method 200 for affecting a user's ability to perceive noise generated by a hard drive in accordance with some embodiments of the present disclosure. The method 200 may be performed by the system 100 of FIG. 1. The flow begins at block 201 and may proceed to block 203 where the processing unit 113 may receive a content stream to be output to a user. The content stream may include an audio component and a video component. The content stream may further include volume data and timing data with respect to the audio component. The content stream may include or correspond to television programming. Additionally or alternatively, the content stream may include any multimedia content. Following the step of block 203, the flow may proceed to block 205 where the processing unit 113 may analyze and/or process the volume data and the timing data. The step of block 205 may include, for example, determining any or all of periods of silence, periods of relatively low volume, periods of relatively high volume, periods of maximum volume, periods of minimum volume during one or more segments of the content. For example, the foregoing volume periods may be determined for the entire length of the content, one or more segments of the entire length of the content, or a buffer period.

Following the step of block 205, the flow may proceed to block 207 where the processing unit 113 may transmit operating instructions to the hard disk 119, the instructions based, at least in part, on the volume data and the timing data. For example, the processing unit 113 may instruct the hard disk 119 to preferentially carry out read/write operations, or a selected segment of read/write operations (e.g., operations associated with heightened noise generation such as those involving rapid acceleration/deceleration) concomitantly with respect to periods of relatively high audio volume outputted to users. Similarly, the processing unit 113 may instruct the hard disk 119 to preferentially cease read/write operations, or carry out a selected segment of read/write operations (e.g., operations associated with low noise generation such as those involving low acceleration/deceleration) concomitantly with respect to periods of silence and/or periods of relatively low audio volume being output to users.

After the step of block 207, the flow may proceed to block 209 where the processing unit 113 may output the audio component and/or the video component on the display device 105. The step of block 209 may further include the hard disk 119 carrying out one or more read/write operations in accordance with the instructions received from the processor in the step of block 207. That is, the hard disk 119 may synchronize the performance of read/write operations and/or the rate of the read/write operations with the relative volume of the audio component output to users. In this manner, instances of relatively high volume audio being presented to users may mask instances of elevated noise generation attributable to the hard disk 119. The flow may then proceed to block 211 and end.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and/or other suitable storage medium.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The methods and systems described herein have generally related to the operations of a hard disk. It should be appreciated that embodiments may operate to mask the noise generated by the action of any storage device, such as a CD-ROM or DVD-ROM drive or burner, or any other storage device generating noise during operation. Likewise, different electrical or electronic systems, such as cooling fans, mechanical actuators and the like may be activated and deactivated, cycled or otherwise controlled in accordance with the disclosure herein to mask the operating noise of such components.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
a processing unit; and
a storage device communicably coupled to the processing unit, the storage device comprising a hard disk drive which comprises a head and a disk;
wherein the processing unit is provided with computer implemented instructions to:
receive a content stream comprising an audio component and a video component, wherein the content stream further comprises volume data and timing data relating to the audio component; and
instruct the storage device to carry out read/write operations of the hard disk drive based, at least in part, on the volume data and the timing data;

identify a plurality of audio segments of the audio component, wherein a plurality of the identified segments correspond to at least one of periods of silence, periods of relatively high volume, periods of relatively low volume, periods of maximum volume, and periods of minimum volume;

instruct the head to cease movement for non-critical read/write operations during periods of relatively low volume and periods of silence; and instruct the head to move at relatively low acceleration/deceleration rates or move at minimum acceleration/deceleration rates for critical read/write operations during periods of relatively low volume and periods of silence.

2. The system of claim 1, wherein the processing unit is provided with further computer implemented instructions to:
determine, based at least in part on the volume data and the timing data, volume as a function of time for the audio component.

3. The system of claim 1 wherein the processing unit is provided with further computer implemented instructions to:
establish acceleration/deceleration rates of the head for carrying out read/write operations on the disk, wherein the acceleration/deceleration rates are established by the processing unit based on the determined volume as a function of time.

4. The system of claim 1, wherein the processing unit is provided with further computer implemented instructions to:
instruct the head to move at relatively high or maximum acceleration/deceleration rates concomitantly with respect to either or both of periods of relatively high volume and periods of maximum volume.

5. The system of claim 1, further comprising a display device, wherein the processing unit is provided with further computer implemented instructions to:
transmit the audio and video components to a display device.

6. The system of claim 1, wherein the processing unit and storage device are components of a content receiver.

7. A method for reducing a user's ability to perceive noise generated by a hard disk drive that comprises a head and a disk, the method comprising:
receiving a content stream comprising an audio component, a video component, volume data relating to the audio component, and timing data relating to the audio component;

analyzing, by a computing device, the volume data and timing data to determine a portion of the audio component having a volume exceeding a threshold;

identifying a plurality of audio segments of the audio component, wherein a plurality of the identified segments correspond to any or all of periods of silence, periods of relatively high volume, periods of relatively low volume, periods of maximum volume, and periods of minimum volume; and transmitting instructions to the hard disk drive for carrying out read/write operations, wherein the instructions are based, at least in part, on the volume data and the timing data, the instructions instruct the head to cease movement for non-critical read/write operations during periods of relatively low volume or periods of silence and instruct the head to move at relatively low acceleration/deceleration rates or move at minimum acceleration/deceleration rates for critical read/write operations during periods of relatively low volume and periods of silence.

8. The method of claim 7, further comprising determining, based at least in part on the volume data and the timing data, volume as a function of time for the audio component.

9. The method of claim 7 wherein the method further comprises establishing acceleration/deceleration rates of the head for carrying out read/write operations on the disk, wherein the acceleration/deceleration rates are established by the processing unit based on the determined volume as a function of time.

10. The method of claim 7 wherein the instructions further instruct the head to move at relatively high or move at maximum acceleration/deceleration rates concomitantly with respect to either or both of periods of relatively high volume and periods of maximum volume.

11. A method of storing content on a storage medium, the method comprising:
receiving a content stream comprising an audio component and a video component;

analyzing the content stream, utilizing the processing unit, to identify a portion of the audio component having a volume exceeding a threshold;

identifying a plurality of audio segments of the audio component, wherein a plurality of the identified segments correspond to any or all of periods of silence, periods of relatively high volume, periods of relatively low volume, periods of maximum volume, and periods of minimum volume; and communicating instructions to hard disk drive for carrying out read/write operations concurrently with output of the identified portion of the audio component, the instructions instruct the head to cease movement for non-critical read/write operations during periods of relatively low volume or periods of silence and instruct the head to move at relatively low acceleration/deceleration rates or move at minimum acceleration/deceleration rates for critical read/write operations during periods of relatively low volume and periods of silence.

12. The method of claim 11 wherein the content stream further comprises volume data and timing data related to the audio component, the method further comprising:
determining, based at least in part on the volume data and the timing data, volume as a function of time for the audio component.

13. A non-transitory computer-readable storage medium having computer-executable instructions stored thereon that, when executed by at least one computer processor, cause the at least one computer processor to perform reducing a user's ability to perceive noise generated by a hard disk drive that comprises a head and a disk, the reducing comprising:
receiving a content stream comprising an audio component, a video component, volume data relating to the audio component, and timing data relating to the audio component;

analyzing, by a computing device, the volume data and timing data to determine a portion of the audio component having a volume exceeding a threshold;

identifying a plurality of audio segments of the audio component, wherein a plurality of the identified segments correspond to any or all of periods of silence, periods of relatively high volume, periods of relatively low volume, periods of maximum volume, and periods of minimum volume; and transmitting read/write instructions to the hard disk drive for carrying out read/write operations, wherein the read/write instructions are based, at least in part, on the volume data and the timing data, the read/write instructions instruct the head to cease movement for non-critical read/write operations during periods of relatively low volume or periods of silence and instruct the head to move at relatively low acceleration/deceleration rates or move at minimum acceleration/deceleration rates for critical read/write operations during periods of relatively low volume and periods of silence.

14. The non-transitory computer-readable storage medium of claim 13 wherein the reducing further comprises determining, based at least in part on the volume data and the timing data, volume as a function of time for the audio component.

15. The non-transitory computer-readable storage medium of claim 13 wherein the reducing further comprises establishing acceleration/deceleration rates of the head for carrying out read/write operations on the disk, wherein the acceleration/deceleration rates are established by the processing unit based on the determined volume as a function of time.

16. The non-transitory computer-readable storage medium of claim 13 wherein the read/write instructions further instruct the head to move at relatively high or maximum acceleration/deceleration rates concomitantly with respect to either or both of periods of relatively high volume and periods of maximum volume.

\* \* \* \* \*